United States Patent [19]

Williams

[11] Patent Number: 5,009,495
[45] Date of Patent: Apr. 23, 1991

[54] HINGE FOR EYEGLASSES

[76] Inventor: Robert D. Williams, 5374 S. Datura St., Littleton, Colo. 80120

[21] Appl. No.: 358,699

[22] Filed: May 26, 1989

[51] Int. Cl.⁵ .......................... G02C 5/14; G02C 5/22
[52] U.S. Cl. ................................... 351/153; 351/121; 16/228
[58] Field of Search ............... 351/121, 153, 113, 114, 351/116; 16/228

[56] References Cited
U.S. PATENT DOCUMENTS
4,345,848  8/1982  Cheselka .......................... 16/228

Primary Examiner—Rodney B. Bovernick
Attorney, Agent, or Firm—Wm. Griffith Edwards

[57] ABSTRACT

A hinge for the temples of eyeglasses and the like, comprises interfitting convex and concave conical hinge members held in engagement by elongated elastic members. The elastic members allow relative movement of the hinge members under stress and then return the members to their normal fitting relationship when the stress is removed. The elastic members, when worn or weak, are easily replaceable by the user.

9 Claims, 1 Drawing Sheet

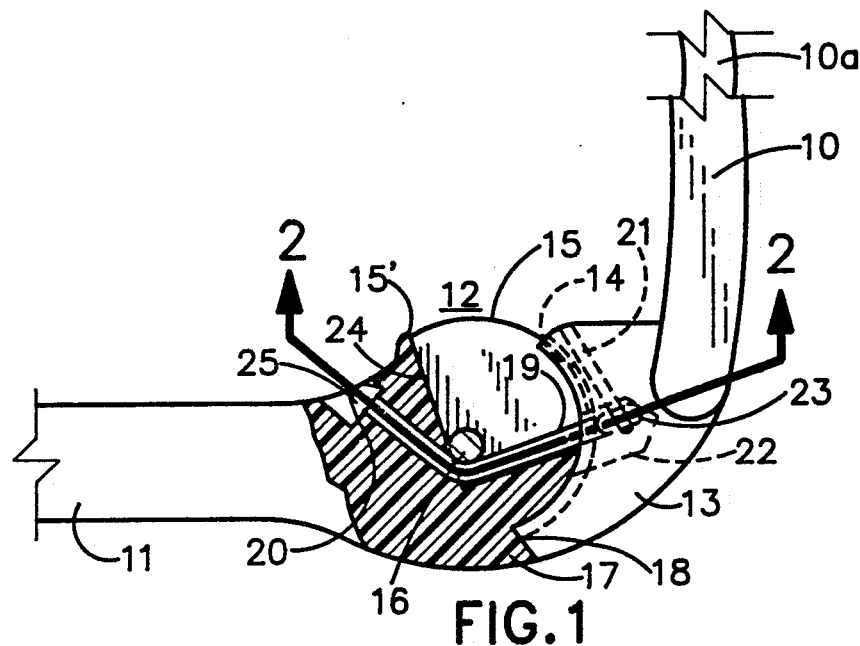
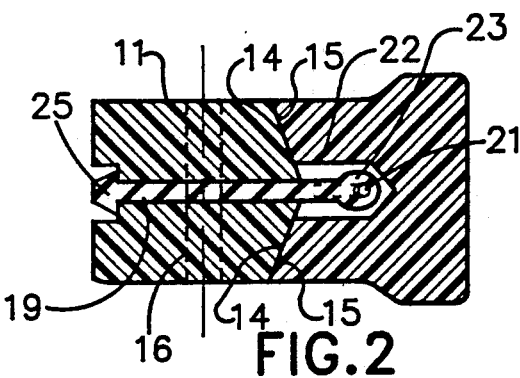
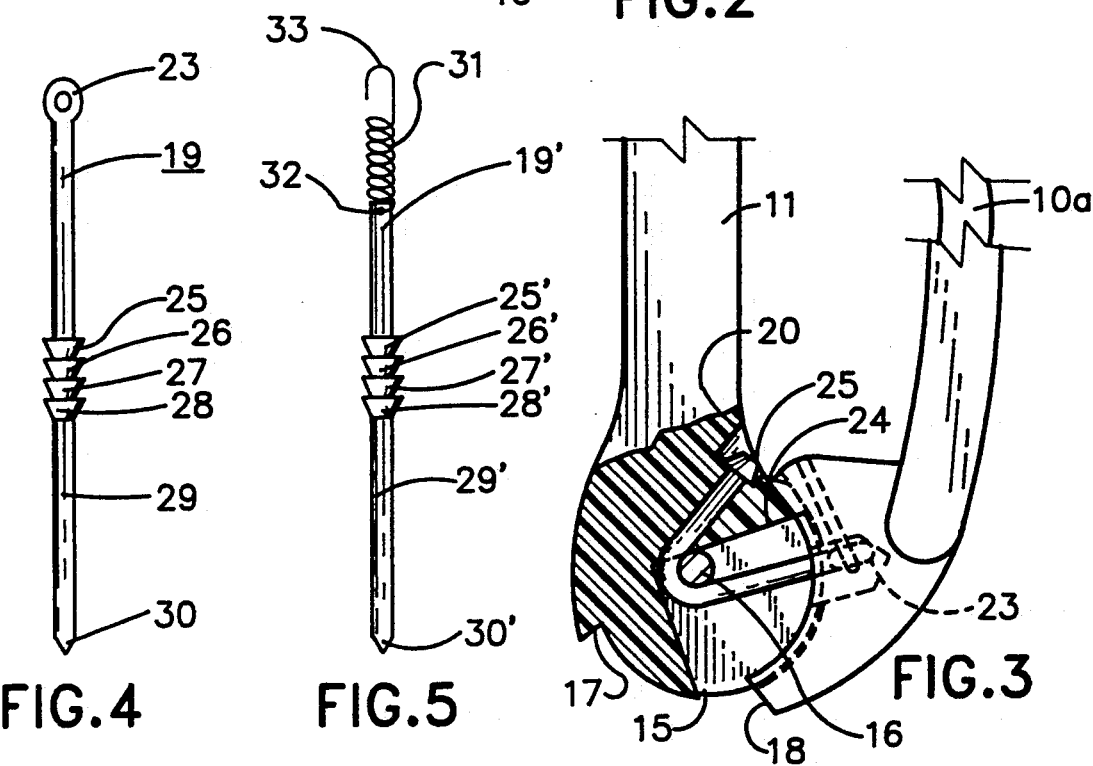

HINGE FOR EYEGLASSES

This invention relates to eyeglasses or spectacles and particularly to an improved hinge for attaching the temples to the lenses.

In a pair of eyeglasses the hinges which attach the temples to the frame or other attachment on the lenses may be damaged during use and frequently such damage requires that the glasses be taken to an optician. Accordingly, it is an object of the present invention to provide an improved hinge arrangement which is less subject to injury.

It is another object of this invention to provide an improved hinge for eyeglasses which is less subject to damage during use and will better withstand abuse.

It is a further object of this invention to provide an improved hinge for eyeglasses which may be easily and quickly repaired in the event of damage thereto.

BRIEF SUMMARY OF THE INVENTION

Briefly, the eyeglass hinge of this invention comprises complementary curved bearing surfaces, such as conical surfaces, secured to the frame and to the temple. These surfaces are held in engagement by a highly elastic tie member or members which hold the complementary surfaces in face engagement under the conditions or ordinary use but which afford separation of the surfaces and easing of the pressures thereon should an unusual bending or movement of the temples occur. The elastic member includes elongated elastic tie members having spaced attaching means formed thereon for engagement with respective ones of the curved surface elements; the distance between the attaching means is selected so that the tie member may be inserted in a passage and the hinge assembly may be drawn into position so that one attaching means engages one of the elements of the hinge while the other is pulled beyond and released for return against the other element acting as a stop so that the elements are urged toward one another by the elastic member stretched between the two attaching means. The portion of the elastic member used for gripping and pulling during the installation may then be removed so that the eye glasses are again in condition for use. In another form a spring is used to provide the elastic function.

BRIEF DESCRIPTION OF THE DRAWING

FIG. 1 is a top plan view partly in section of the hinged portion of a pair of spectacles provided with a hinge embodying the invention;

FIG. 2 is a sectional elevation view of the hinge assembly taken along the line 2—2 of FIG. 1;

FIG. 3 is a view similar to FIG. 1 illustrating the hinge in the folded position of the glasses;

FIG. 4 is a plan view of an elastic attaching member before installation in the hinge; and FIG. 5 is a somewhat diagrammatic view similar to FIG. 4, illustrating another modification of the elastic attaching member.

DETAILED DESCRIPTION OF THE DRAWING

FIG. 1 is a top plan view of a portion of a pair of eyeglasses which include a frame 10 and a temple 11 connected by a hinge member 12; the member 12 is connected to the frame 10 by a supporting member 13 rigidly connected to the frame 10 and the lens indicated at 10a is mounted in the frame. The hinge member 12 is formed as shown in FIG. 2 by a pair of oppositely facing concave conical bearing surfaces 14, formed in the support member 13, and complementary convex conical bearing surfaces 15 provided in the member 13; and the conical surfaces 14 and 15 are concentric with and generated about the hinge axis, the apex or point position of each cone being on the axis. The surfaces 14 and 15 are thus portions of respective truncated oppositely facing cones. The temple 11 is shown in FIG. 1 in its extreme open position wherein a shoulder or stop 17 on the temple rests against a shoulder or stop 18 on the support member 13.

The axis of the hinge which is the axis of the conical surfaces 14 and 15 lies parallel to the pin 16 and lies at about the one 'clock position as viewed in FIG. 1 and at about the four twenty-two o'clock position as viewed in FIG. 3.

The conical surfaces 14 and 15 have their bases in a common central plane perpendicular to the center line or axis of the hinge member. The conical surfaces 14 have been shown as extending over an arc of about 180°; thus the frame 10 and the temple 11 can be rotated with respect to one another about the hinge axis and relative axial movement is prevented by the oppositely sloping conical surfaces.

As shown in FIG. 2 the conical surfaces are held in engagement by a highly elastic tie member 19 which is stretched between a seat 20 in the hinge member 12 and the inner end of a metal rod 21 mounted in the member 13. As shown in dotted lines in FIG. 1, the rod 21 extends from the inner face of the member 13 into a recess 22 and slopes slightly away from the temple 11, so that a loop 23 on the end of the highly elastic member 19 is retained on the rod by its tension. The inner end of the rod 21 is spaced from the opposite wall of the recess 22 to provide room for installing and removing the loop 23. The member 19 is stretched about the cylinder 16 and holds the complementary conical surfaces 14 and 15 in engagement. A radially extending pie-shaped opening or slot 24 is formed in the hinge member 12; when the temple 11 is rotated clockwise as viewed in FIG. 1 the pie-shaped opening or slot allows the elastic member 19 to rotate about cylinder 16 through about ninety degrees from the position shown in FIG. 1 to that shown in FIG. 3. As indicated in the drawing, the elastic member 19 moves from an obtuse angle configuration of FIG. 1 to a U-shaped acute angle configuration of FIG. 3. Throughout the rotating movement of the temple 11 and support member 13 with respect to one another the elastic member 19 urges the temple and support toward one another and maintains the conical surfaces 14 and 15 in bearing engagement under steady pressure.

As shown in FIG. 4 the original configuration of the elastic member 19 includes the looped head 23, the elongated body member 19, the frustoconical heads 25, 26, 27 and 28, and a second portion 29 of the member 19 which extends beyond the head 28 and is terminated in a pointed end portion 30 which is provided to facilitate the installing of the member 19. The material and dimensions of the member 19 and the frustoconical heads are selected so that the heads may be drawn through the passage in the temples 11, the heads 25, 26, 27 and 28 being compressible so that they slide through the passage with movement of member 19, and when they are released from the passage will re-expand.

When a used or weakened elastic member 19 is to be replaced, the temple 11 and member 13 are pulled apart sufficiently for a knife to be inserted for cutting the member 19; or the head 25 may be gripped by a suitable pair of pliers and pulled out and cut from the member 19. The loop 23 is then removed from the pin 21 and the member 19 is removed and discarded. A new member 19, constructed as shown in FIG. 4 is then installed. The new elastic member is installed by placing its loop 23 in the recess 22 and over the end of the rod 21, and then inserting the point 30 in the passage in the temple 11 which is accessible through the slot 24, and passing the point 30 and the member 29 through the passage in the temple leading to the recess 20 by pressing it into the passage until the point enters the recess 20 and can be gripped and pulled through. The new elastic member is pulled through until the required tension is provided, for example, by the seating of the head 25 in the seat 20. The plurality of conical heads is provided so that the desired amount of stretching may be selected. When the tension in the member 19 has reached the required degree, the extended body portion 29 and one or more of the conical members 26, 27 and 28 are removed leaving the elastic member installed to complete the hinge. As stated above, the head members 25, 26, 27 and 28 are compressed as they are moved through the passage between the column 16 and the recess 20 and any of the conical heads which are pulled beyond the selected head expand and are in a position to be removed when the selected head is in place. Thus the elastic member may be replaced easily when worn or weakened, and this can be accomplished without difficulty, the conical surfaces 14 and 15 being held in engagement while the new elastic member is being installed.

During the handling of the glasses the elastic members hold the conical surfaces of the hinge in working engagement and should there be a strain on the hinge due to a twisting or other force during the handling of the temples and frame, the elastic member will allow movement without damage to any of the parts of the structure. When such movement occurs the strain is removed.

The present invention provides a hinged mounting for the temples or eyeglasses and the like, which assures minimum damage to the frames or hinges because of pressure on the temples and frame and further provides a ready arrangement for the owner to replace the elastic members himself. In this connection it will be noted that when the elastic members are provided with a plurality of conical heads, if a head other than the maximum pressure head is selected, the unused head or heads still lie within the passage in the hinge part and will remain compressed within the passage while the selected head expands outside the passage to act as the positioning head for the elastic member. The seat 20 and the head 25 or other selected one of the heads are positioned to be visible only on the inner side of the frame and temple.

The modification of the attaching member shown in FIG. 5 is provided with a helical spring indicated diagrammatically at 31 to provide the required tension for holding the bearing surfaces in engagement. The hinge structure is the same as that of FIGS. 1, 2 and 3 and the same numerals with a prime have been used to indicate corresponding parts. Instead of the highly elastic member 19 of FIG. 4, a shorter length 19' of pliable plastic material is provided. The spring 31 has an anchor 32 solidly embedded in the end of the member 19' for securely attaching it thereto and at its other end has a hook 33 for engagement with the end of the rod 21 in the recess 22. The shorter member 19' of FIG. 5 and the spring 31 thus provide an elastic attaching member which may be replaced when worn or broken in the same manner as the member 19 of the first embodiment.

The embodiments of this invention disclosed in the drawing include the presently preferred bearing arrangement wherein oppositely sloping conical bearing surfaces are employed to prevent axial displacement of the bearings. Other bearing arrangements within the scope of the invention include different arrangements for preventing axial displacement of the bearing surfaces, for example, a pair of cylindrical bearing surfaces, may be provided with a ring in one bearing half and an annular groove in the other to prevent axial shifting of the bearing surfaces with respect to one another, or annular stops may be provided at the ends of one bearing to prevent the shifting of the other bearing with respect thereto.

While the invention has been illustrated and described in connection with a specific configuration and arrangement of the parts of the assembly of the spectacle frame and temples, various other applications and modifications will occur to those skilled in the art. Therefore, it is not desired that this invention be limited to the specific construction disclosed and it is intended, by the appended claims, to cover all modifications which fall within the spirit and scope of the invention.

I claim:

1. An improved eyeglass mounting assembly including supporting means for the lenses and a pair of temples together with means for pivotally mounting each of said temples on said supporting means adjacent respective ones of the lenses for movement about its respective pivotal axis between a folded position and an open use position, each of said means for pivotally mounting said temples comprising a bearing member having complementary bearing surfaces one on a respective one of said supporting means and the other on the respective temple, and means for maintaining said complementary bearing surfaces in face engagement with one another, aid maintaining means including a respective elongated elastic member secured under tension between the respective one of said supporting means and the respective temple for urging said complementary surfaces into face engagement and retaining said temples in position on said supporting means, each said elastic member being attached to a respective temple at one end and to a respective lens supporting means at the other.

2. An improved eyeglass mounting assembly as set forth in claim 1 wherein said bearing surfaces are conical and constitute a pair of oppositely facing bearings whereby axial movement of said bearings is prevented.

3. An improved eyeglass mounting assembly as set forth in claim 1 wherein said bearing surfaces are curved, and including means for preventing axial movement of said surfaces.

4. An improved eyeglass assembly as set forth in claim 3 wherein a passage is provided for said elastic member extending radially from the surface of the temple and around its center or rotation and terminating in an open radially extending chamber which affords freedom for relative lateral movement of the elastic member and the temple within the chamber upon rotation of the temple between its folded and open positions, said elastic member being anchored at one end to said temple adjacent the entrance to said passage and at its other end to the adjacent supporting means.

5. An improved eyeglass assembly as set forth in claim 4 wherein said bearing surfaces are in engagement over an arc of about 120° and each of said temples is rotatable through an angle of about 90° with respect to said frame.

6. The eyeglass mounting assembly of claim 1 wherein said elastic member is a strip of elastic material having a first enlargement at one end for anchoring said end, a second enlargement for affording the stretching of said strip between said enlargements and an extension of said strip beyond said second enlargement for affording the gripping of said strip and its stretching between said enlargements.

7. The eyeglass mounting assembly as set forth in claim 6 including a plurality of said second enlargements spaced from one another whereby different lengths of said strip may be selected for application of a stretching force.

8. A temple hinge for eyeglasses and the like including bearing members having complementary bearing surfaces one for attaching to a lens of the glasses and the other for attaching to a temple, and means for maintaining said surfaces in face engagement with one another, said means including an elastic member attached to said temple at one end and to said lens attaching means at the other for holding said surfaces in sliding engagement with one another while permitting separation of the bearing surfaces and release from strain under excessive external force.

9. A temple hinge for eyeglasses as set forth in claim 8 wherein said elastic member includes a helical spring portion connected therein near the temple attaching end thereof.

* * * * *